United States Patent Office 3,773,920
Patented Nov. 20, 1973

3,773,920
SUSTAINED RELEASE MEDICINAL COMPOSITION
Atsushi Nakamoto, Kawasaki, Keizaburo Ogawa, Kawagoe, and Tadashi Ukigaya, Tokyo, Japan, assignors to Nikken Chemical Co., Ltd., Tokyo, Japan
No Drawing. Filed July 14, 1971, Ser. No. 162,657
The portion of the term of the patent subsequent to Dec. 21, 1988, has been disclaimed
Int. Cl. A61k 27/12
U.S. Cl. 424—19
9 Claims

ABSTRACT OF THE DISCLOSURE

A sustained release medicinal composition is formed from (1) 100 parts of by weight granules containing a medicament, a metal salt of a higher fatty acid and a binder, (2) 50–200 parts by weight of ethyl cellulose and (3) 30–120 parts by weight of a water soluble polymer.

BACKGROUND OF THE INVENTION

Field of invention

This invention relates to a sustained release medicinal composition and more particularly, to a sustained release medicinal composition prepared for releasing an active ingredient over an extended period of time.

Description of prior art

There has been an increasing need for medicinal compositions having sustained releasing or slow releasing properties. Various types of such medicinal compositions have been commercialized and can be classified according to the following three categories.

(a) medicinal compositions in which granules or tablets containing a medicine are coated with a digestive fluid-insoluble material, such as wax or a synthetic resin;
(b) medicinal compositions in which a medicine is dispersed in a digestive fluid-insoluble material or is mixed with said digestive fluid-insoluble material and a digestive fluid-soluble material; and
(c) medicinal compositions in which a medicine is held on an ion-exchange resin.

There are many disadvantages however in the preparation or administration of such conventional sustained release medicinal compositions.

In the first instance (a), highly skilled personnel are required to prepare the composition, because of difficulty of the coating technology involved. More-over, that expendient requires a significant amount of time for preparation since repeated coating operations are necessary, depending upon the thickness of the film.

In medicinal compositions (b), an undesirably large quantity of release delaying agents (insoluble materials) are required, relative to the quantity of medicament contained. More-over, a significant amount of medicament is frequently excreted from the body with the binder before it can be absorbed and utilized by the body. Another possible difficulty with composition (b), is the high possibility of accident in the preparation of this type of composition, because the medicament must be mixed with the insoluble material in molten form.

Compositions (c), are possible only with certain specific medicaments which are compatible with the ion-exchange resins, and even with those medicaments the rate of release is quite dependent upon pH and hence the rate of change can be significantly affected by even slight changes in the pH of the gastric fluids, so that adequate control of the release velocity is quite difficult.

SUMMARY OF INVENTION

Accordingly, it is an object of this invention to provide an improved sustained release medicinal composition.

It is another object of this invention to provide an improved sustained release medicinal composition which releases the medicine at a controlled velocity.

It is another object of this invention to provide a process for preparation of an improved sustained release medicinal composition.

These and other object have now been attained by preparing granules containing a medicament, a higher fatty acid metal salt and a binder which are then admixed with ethyl cellulose, and a water soluble polymer, and if desired, a lubricant, a coloring agent, and/or a seasoning agent and compression molding said admixture into tablet form.

DETAILED DESCRIPTION OF EMBODIMENT

In the medicinal compositions of this invention, any type of medicament which can be dissolved in water, can be used. Suitable medicaments include ethyl phenylephrine hydrochloride, butyl biguanide hydrochloride, isoproterenol hydrochloride, chloropheniramine maleate, carbinoxamine maleate, ephedrine hydrochloride, dihydrocodeine phosphate, etc.

Suitable metal salts of higher fatty acid include the magnesium, calcium and aluminum salts of stearate, palmitate and oleate, etc.

Suitable binders used in the medicinal composition are those which are soluble in the organic solvent, used for preparing the granules. Good results are obtainable with said binders as hydroxypropyl cellulose, hydroxypropylmethyl cellulose, polyvinyl acetate, polyvinyl pyrrolidone, polymethyl methacrylate, copolymer of methyl acrylate-methacrylic acid, and methyl type silicone resin, etc.

Suitable water soluble polymers include hydroxypropyl cellulose, hydroxypropyl methyl cellulose, methyl cellulose, sodium carboxymethyl cellulose, polyvinyl alcohol, polyvinyl pyrrolidone, gum arabic, etc.

The release velocity of the medicament can be adjusted by proper selection of the ratio of the medicament, the metal salt of the higher fatty acid, the ethyl cellulose and the water soluble polymer.

If the ratio of the higher fatty acid salt to the medicament is increased, the release velocity will be decreased. The release velocity will be increased by decreasing the content of the higher fatty acid salt. The quantity of higher fatty acid salt can be selected depending upon the solubility of medicament used, and the desired release velocity. Preferably the composition should contain not less than 30% of higher fatty acid salt in the granules.

It is preferred to use 4–15 weight percent of the binder in the granules, to facilitate good formation of the granules.

Ethyl cellulose and the water soluble polymer are mixed with the medicinal composition, to provide a more uniform release velocity and to provide complete medicament release. The release velocity can be adjusted by selecting the ratio of ethyl cellulose to water soluble polymer. Where the rate of ethyl cellulose is increased, the release velocity will be decreased. On the other hand, where the rate of water soluble polymer is increased, the release velocity will be increased. In order to provide good release velocity uniformity and complete release of the medicament, the rate of water soluble polymer to ethyl cellulose should be in the range of about 30–250%.

Where the total amount of ethyl cellulose and water soluble polymer in the tablet is increased, the uniformity of the release velocity will be improved. On the other hand, where the quantity of granules in the tablet is increased, the uniformity of the release velocity will be impaired.

Accordingly, it is necessary to limit the quantity of granules in the tablet to a maximum of 60%.

It is preferable that the tablet have a compressive strength of at least 1 kg./cm.$^2$. This is not a critical limitation however.

The sustained release medicinal composition of this invention is characterized by a high degree of uniformity of release velocity, and complete medicament release, since the release velocity is not adversely affected by the pH of the gastric fluids or enzymes. The sustained release medicinal composition can be easily prepared by employing conventional apparatus and does not require special skill or, dangerous procedures.

Having generally described the invention, a further understanding can be obtained by reference to the specific examples which are provided herein for purposes of illustration only and are not intended to be limiting in any manner unless otherwise specified.

EXAMPLE 1

7 g. of ethyl phenylephrine hydrochloride and 33 g. of magnesium stearate were mixed and then were kneaded with a solution of 6 g. of methyl type silicon resin in 25 ml. of toluene. The resultant mixture was granulated with a 30 mesh sieve and was air-dried at 50° C.

80 g. of ethylcellulose having a particle size of 30–80 mesh and 40 g. of hydroxypropyl cellulose having a particle size of 30–100 mesh were uniformly mixed with the granules of said mixture. 0.9 g. of magnesium stearate, as lubricant, was further added to the mixture and then was compression-molded into a tablet weighing 166.9 mg. and having a diameter of 8 mm. The result of the release test of ethyl phenylephrine hydrochloride at 37° C. is stated in Table 1. In the test, the artificial gastric juice was used for the first 2 hours, and the artificial intestinal juice was used after 3 hours.

TABLE 1

| | Time, hours | | | | | |
|---|---|---|---|---|---|---|
| | 1 | 2 | 4 | 6 | 8 | 10 |
| Release of active ingredient (percent) | 17.2 | 32.1 | 56.9 | 78.5 | 96.4 | 99.8 |

EXAMPLE 2

7 g. of ethyl phenylephrine hydrochloride and 53 g. of magnesium stearate were mixed and then were kneaded with a solution of 5 g. of hydroxypropyl methyl cellulose in 35 ml. of an equi-equivalent mixture of isopropyl alcohol and dichloromethane.

The resultant mixture was granulated with a 30 mesh sieve and was air-dried at 50° C.

100 g. of ethyl cellulose having a particle size of 30–80 mesh and 55 g. of hydroxypropyl methyl cellulose having a particle size of 30–100 mesh were uniformly mixed with the granules of said mixture. 1 g. of magnesium stearate as a lubricant was further added to the mixture and then was compression-molded into tablets having a weight of 221 mg. and a diameter of 9 mm. The results of a release test of ethyl phenylephrine hydrochloride by the method of Example 1 is stated in Table 2.

TABLE 2

| | Time, hours | | | | | | |
|---|---|---|---|---|---|---|---|
| | 1 | 2 | 4 | 6 | 8 | 10 | 12 |
| Release of active ingredient (percent) | 14.1 | 27.3 | 46.7 | 62.0 | 74.8 | 85.2 | 93.9 |

EXAMPLE 3

50 g. of butyl biguanide hydrochloride, and 35 g. of calcium stearate were uniformly mixed and then were kneaded with a solution of 6 g. of hydroxypropyl cellulose in 50 ml. of ethyl alcohol. The resultant mixture was granulated with a 30 mesh sieve and was air-dried at 50° C.

80 g. of ethyl cellulose having a particle size of 30–80 mesh and 40 g. of sodium carboxymethyl cellulose having a particle size of 30–100 mesh were uniformly mixed with the granules of said mixture. 2 g. of magnesium stearate as a lubricant was further added to the mixture and then was compression-molded into tablets weighing 213 mg. and having a diameter of 9 mm. The results of a release test of butyl biguanide hydrochloride by the method of Example 1 is stated in Table 3.

TABLE 3

| | Time, hours | | | | | |
|---|---|---|---|---|---|---|
| | 1 | 2 | 4 | 6 | 8 | 10 |
| Release of active ingredient (percent) | 19.6 | 31.0 | 52.3 | 72.0 | 88.9 | 100 |

EXAMPLE 4

15 g. of isoproterenol hydrochloride and 55 g. of aluminum palmitate were uniformly mixed and then were kneaded with a solution of 10 g. polyvinyl acetate in 40 ml. of trichloroethane. The resultant mixture was granulated with a 30 mesh sieve and was air-dried at 50° C. of ethyl cellulose having a particle size of 30–80 mesh and 90 g. of gum arabic having a particle size of 30–100 mesh, were uniformly mixed with the granules of said mixture. 2 g. of magnesium stearate as a lubricant was further added to the mixture and then was compression-molded into tablets having a weight of 222 mg. and a diameter of 9 mm. The result of release test of isoproterenol hydrochloride by the method of Example 1 is stated in Table 4.

TABLE 4

| | Time, hours | | | |
|---|---|---|---|---|
| | 1 | 2 | 4 | 6 |
| Release of active ingredient (percent) | 20.9 | 38.1 | 67.4 | 92.2 |

EXAMPLE 5

10 g. of chlorpheniramine maleate and 60 g. of aluminum oleate were uniformly mixed and then were kneaded with a solution of 10 g. polymethyl methacrylate in 40 ml. of trichlorethane. The resultant mixture was granulated with a 30 mesh sieve and was air-dried at 50° C.

50 g. of ethyl cellulose having a particle size of 30–80 mesh and 90 g. of polyvinyl pyrrolidone having a particle size of 30–100 mesh were uniformly mixed with the granules of said mixture. 1 g. of magnesium stearate as lubricant was further added to the mixture and then was compression-molded into tablets having a weight of 221 mg. and a diameter of 9 mm. The result of a release test of chlorpheniramine maleate by the method of Example 1 is stated in Table 5.

TABLE 5

| | Time, hours | | | | | |
|---|---|---|---|---|---|---|
| | 1 | 2 | 4 | 6 | 8 | 10 |
| Release of active ingredient (percent) | 19.4 | 32.7 | 53.6 | 70.5 | 85.6 | 99.4 |

EXAMPLE 6

8 g. of carbinoxamine maleate and 54 g. of magnesium stearate were uniformly mixed, and then were kneaded with a solution of 3 g. of hydroxypropyl methyl cellulose in 37 ml. of an equivalent mixture of isopropyl alcohol and dichloromethane. The resultant mixture was granulated with 30 mesh sieve and air-dried at 50° C. 80 g. of ethyl cellulose having a particle size of 30–80 mesh and 40 g. of hydroxypropyl methyl cellulose having a particle size of 80–100 mesh were uniformly mixed with the granules of said mixture. 1.0 g. of magnesium stearate as a lubricant was further added to the mixture and then was compression-molded into tablets of 186 mg. in weight and 8 mm. in diameter. The results of a release test by the method of Example 1 is stated in Table 6.

TABLE 6

| | Time, hours | | | | | |
|---|---|---|---|---|---|---|
| | 1 | 2 | 4 | 6 | 8 | 10 | 12 |
| Release of active ingredient (percent) | 20.5 | 32.0 | 52.5 | 68.0 | 81.0 | 93.0 | 99.2 |

EXAMPLE 7

50 g. of ephedrice hydrochloride and 60 g. of calcium stearate were uniformly mixed, and then were kneaded with a solution of 10 g. of polyvinyl pyrrolidone in 70 ml. of ethanol. The resultant mixture was granulated with 30 mesh sieve and air-dried at 50° C. 120 g. of ethyl cellulose having a particle size of 30–80 mesh and 40 g. of methyl cellulose having a particle size of 30–100 mesh were uniformly mixed with the granules of said mixture. 1.5 g. of magnesium stearate as a lubricant was further added to the mixture and then was compression-molded into tablets having a weight of 281.5 mg. and a diameter of 10 mm. The results of a release test by the method of Example 1 is stated in Table 7.

TABLE 7

| | Time, hours | | | | |
|---|---|---|---|---|---|
| | 1 | 2 | 4 | 6 | 8 | 10 |
| Release of active ingredient (percent) | 20.5 | 35.7 | 56.2 | 71.7 | 84.8 | 94.7 |

EXAMPLE 8

20 g. of dihydrocodeine phosphate and 40 g. of aluminum stearate were uniformly mixed, and then were kneaded with a solution of 5 g. of copolymer of methyl methacrylate-methacrylic acid in 35 ml. of ethanol. The resultant mixture was granulated with a 30 mesh sieve and air-dried at 50° C. 80 g. of ethyl cellulose, having a particle size of 30–80 mesh and 40 g. of polyvinyl alcohol, having a particle size of 30–100 mesh, were uniformly mixed with the granules of said mixture.

1 g. of magnesium stearate as a lubricant was further added to the mixture and then was compression-molded into tablet form having a weight of 186 mg. and a diameter of 8 mm.

The results of a release test by the method of Example 1 is stated in Table 8.

TABLE 8

| | Time, hours | | | | |
|---|---|---|---|---|---|
| | 1 | 2 | 4 | 6 | 8 | 10 |
| Release of active ingredient (percent) | 17.3 | 31.6 | 56.8 | 75.4 | 89.7 | 98.4 |

Having fully described the invention, it will be apparent to one of ordinary skill in the art that many changes and modifications can be made thereto without departing from the spirit or scope of the invention. Accordingly what is is intended to be protected by Letters Patent and what is claimed is:

1. A sustained release medicinal composition comprising a compressed release velocity controlled tablet having a compressive strength of at least 1 kg/cm.$^2$ consisting essentially of a maximum of 60 percent by weight of granules consisting essentially of 5–60 weight percent of a medicament, 30–85 weight percent of a release velocity decreasing metal salt of a higher fatty acid, over and above conventional tablet lubricant concentrations, consisting of magnesium stearate, calcium stearate, aluminum stearate, aluminum palmitate, aluminum oleate, and 3–15 weight percent of an organic solvent soluble binder selected from the group consisting of hydroxypropyl cellulose, hydroxypropylmethyl cellulose, polyvinyl acetate, polyvinyl pyrrolidone, polymethyl methacrylate, copolymer of methyl acrylate-methacrylic acid, and methyl type silicone resin, which granules are admixed with 50–200 parts by weight of release velocity decreasing ethyl cellulose said granules having a particle size of 30–80 mesh, and 30–120 parts by weight of release velocity increasing water soluble polymer granules selected from the group consisting of hydroxypropyl cellulose, hydroxypropyl methyl cellulose, sodium carboxymethyl cellulose, gum arabic, polyvinyl pyrrolidone, methyl cellulose and polyvinyl alcohol, said granules having a particle size of 30–100 mesh.

2. The sustained release medicinal composition of claim 1, wherein said medicament is ethylephrine hydrochchloride; said salt of a higher fatty acid is magnesium stearate; said binder is methyl type silicon resin; and said water soluble polymer is hydroxypropyl cellulose.

3. The sustained release medicinal composition of claim 1, wherein said medicament is ethylephrine hydrochlorride; said salt of a higher fatty acid is magnesium stearate; said binder is hydroxymethyl cellulose; and said water soluble polymer is hydroxypropyl methyl cellulose.

4. The sustained release medicinal composition of claim 1, wherein said medicament is butyl biguanide hydrochloride; said salt of a higher fatty acid is calcium stearate; said binder is hydroxypropyl cellulose; and said water soluble polymer is sodium carboxymethyl cellulose.

5. The sustained release medicinal composition of claim 1, wherein said medicament is isoproterenol hydrochloride; said salt of fatty acid is aluminum palmitate; said binder is polyvinyl acetate; and said water soluble polymer is gum arabic.

6. The sustained release medicinal composition of claim 1, wherein said medicament is chloropheniramine maleate; said salt of fatty acid is aluminum oleate; said binder is polymethyl methacrylate; and said water soluble polymer is polyvinyl pyrrolidone.

7. The sustained release medicinal composition of claim 1, wherein said medicament is carbinoxamine maleate; said salt of fatty acid is magnesium stearate; said binder is hydroxypropylmethyl cellulose; and said water soluble polymer is hydroxypropylmethyl cellulose.

8. The sustained release medicinal composition of claim 1, wherein said medicament is ephedrine hydrochloride; said salt of a higher fatty acid is calcium stearate; said binder is polyvinyl pyrrolidone; and said water soluble polymer is methyl cellulose.

9. The sustained release medicinal composition of claim 1, wherein said medicament is dihydrocodeine phosphate; said salt of fatty acid is aluminum stearate; said binder is copolymer of methyl acrylate and methacrylic acid; and said water soluble polymer is polyvinyl alcohol.

References Cited

UNITED STATES PATENTS

| 3,629,393 | 12/1971 | Nakamoto et al. | 424—22 |
| 3,148,124 | 9/1964 | Gaunt | 424—22 |
| 3,102,845 | 9/1963 | Fennell | 424—22 |

SHEP K. ROSE, Primary Examiner

U.S. Cl. X.R.

424—20, 22